Sept. 14, 1937.  E. ROSS  2,093,023
LAMP MOUNT
Filed June 4, 1935
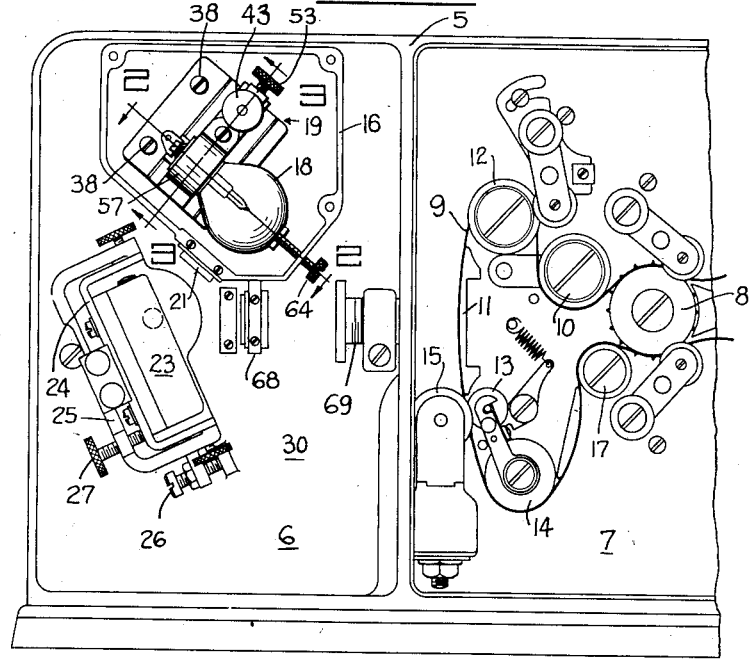
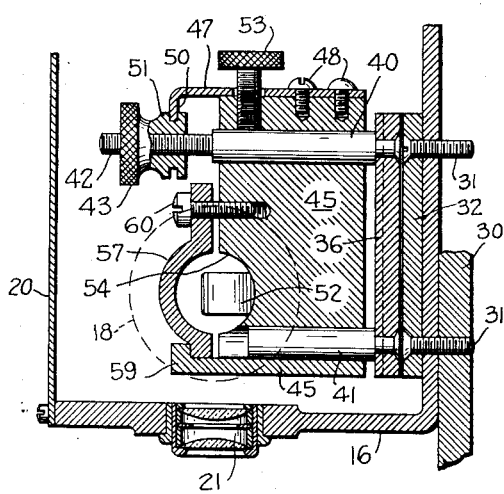
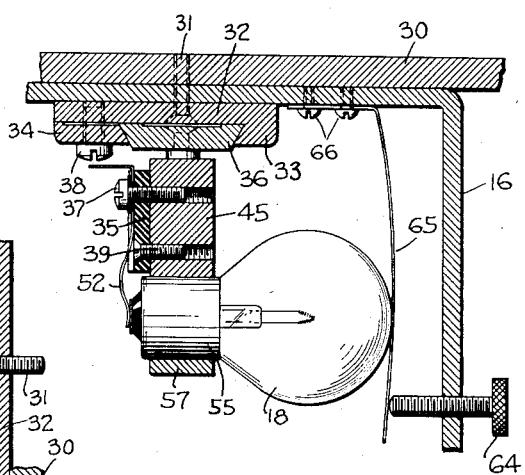
INVENTOR
Ernest Ross
BY
ATTORNEY Patented Sept. 14, 1937

2,093,023

UNITED STATES PATENT OFFICE 2,093,023

LAMP MOUNT

Ernest Ross, Elmhurst, N. Y., assignor to United Research Corporation, Long Island City, N. Y., a corporation of Delaware Application June 4, 1935, Serial No. 24,831

6 Claims. (Cl. 240—52)

This invention relates to sound recording apparatus wherein a light beam from a constant light source is impressed upon the mirror of a galvanometer and reflected therefrom to a light sensitive medium such as a motion picture film.

In the type of recording systems employing a constant light source and galvanometer for recording variable area sound records, it is important that the proper relation is obtained between the light source, reflector, and the film and intermediate optical elements such as condensing and objective lenses. In co-pending application Serial No. 22,788 filed May 22, 1935 an adjustable mounting for the galvanometer of the system is disclosed and claimed. The present application discloses and claims a rugged and particularly convenient mounting for adjusting the constant light source with respect to the condensing lenses and the galvanometer mirror.

An object of the invention therefore is to facilitate the adjustment of a source of light with respect to its related apparatus.

The features of the adjustable mounting and the invention itself will be more fully understood by reference to the following specification read in conjunction with the accompanying drawing, in which Fig. 1 is a sectional view through part of a sound recording unit embodying the invention.

Fig. 2 is a sectional view through the lamp housing taken on the line 2—2 of Fig. 1; and Fig. 3 is a sectional view taken in the direction on the line 3—3 in Fig. 1.

Referring now to the drawing, the section of the sound recording apparatus includes a casing 5 with two compartments 6 and 7. The compartment 7 is of lightproof construction and houses the various film sprockets, rollers and film guide elements. The elements shown include a film 9 driven by a sprocket 8 under a tension roller 10, over a guide roller 12, past a translation point 11, between a flywheel roller 15 and a spring pressed roller 13, under a roller 14, and over a guide roller 17. It is understood, of course, that the film is fed from a supply reel and is taken up by a take-up reel (not shown).

In compartment 6 a lamp housing 16 is shown with the cover removed exposing a constant intensity lamp 18 mounted upon its support 19. Light from the lamp passes through condensing lenses and an aperture at 21 to a mirror in a galvanometer 23 mounted upon adjustable supports made by U-shaped brackets 24 and 25. This galvanometer mount is adjustable in two directions at right angles to each other by a screw 26 and a screw 27 and is disclosed and claimed in co-pending application Serial No. 22,788 filed May 22, 1935, the galvanometer itself being disclosed and claimed in co-pending application Serial No. 20,923 filed May 11, 1935.

Referring now to Figs. 2 and 3 for a description of the structure of the lamp mount, the housing 16 having a cover 20 is attached to the back wall 30 of compartment 6 by means of screws 31 which pass through the housing and engage and maintain in a fixed position the dovetailed guide block 32 which has a section 33 integral therewith and a section 34 of the same shape as section 33 but which may be loosened to adjust an inserted slide 36 along the length of the groove formed by the sections. Screws 38 maintain the slide 36 fixed to the guide 32 when the final position of the slide has been determined. The slide 36 has a pair of studs or pins 40 and 41 projecting therefrom and rigidly secured thereto as by riveting. The pin 40 has a reduced threaded portion 42 on the front thereof on which is threadedly mounted a nut 43.

Slidable upon the pins 40 and 41 is a metal block 45 forming a support for the lamp 18. A strip of metal 47 is secured to the top of the block 45 by any suitable means such as screws 48, the metal strip having a depending flange 50 adapted to engage a groove in a portion 51 of the nut 43. Rotation, therefore, of the nut 43 will adjust the position of the block 45 and consequently the lamp 18 away from and toward the wall 30. A set screw 53 maintains the block 45 fixed on the pins 40 and 41 when the position of the lamp has been determined.

The front edge of the block 45 is provided with a semi-circular groove 54 in which the base 55 of the lamp 18 may be positioned. A clamping bracket 57 has one end positioned in a notch in an extension 59 of block 45, and the other end urged toward the block 45 by a screw 60 to hold the lamp in the groove. One electrical connection is made to the lamp by means of a spring clip 52 bearing on the center base terminal of the lamp. The clip 52 is mounted on an insulator 35 and held thereto and to the block 45 by a screw 37. A second screw 39 aids the screw 37 to hold the strip 35 in position. The other electrical connection is made through the metal portion of the base of the lamp and through the block 45.

The lamp may be given a third direction of adjustment by means of a screw 64 bearing against a spring member 65 attached to the interior of casing 16 by means of screws 66. As the screw 64 is threaded in the casing 16, spring 65 bears against the lamp 18 and the lamp may be moved against the spring clip 52 in the groove of the block 45 and the clamp 57 or moved by the clip when the screw 64 is reversed.

From the above description it is realized that the lamp is adjustable in three directions, at right angles to one another, two of these adjustments being easily made by thumb screws when the lamp is in position. The first adjustment of the slide 36 in the dovetail guide 32 may be made with a screwdriver by loosening the screws 38. After this adjustment has once been made, the other two thumb screw adjustments will suffice to position the lamp at the proper point with respect to the condensing lenses 21 and the mirror of the galvanometer 23. The adjustment of the mirror, of course, as described in the above-mentioned co-pending application is also with respect to the aperture assembly 68, the objective lens mount 69 and the film 9.

What is claimed is:

1. An adjustable mount for providing three directions of movement normal to one another comprising a casing, a guide block attached to said casing, a slide adjustable in the guide of said block, a block mounted upon said slide and adjustable anteriorly thereof, said block having a groove and clamp for mounting an element to be adjusted, a tensioning means at either end of said element to be adjusted and means extending externally of said casing for moving said element in said groove and clamp in a plane normal to the plane of the movement of said block.

2. A mounting for a lamp source to provide three directions of adjustment of said lamp comprising a dovetailed slide adapted to bodily translate said lamp in one direction, a block support for said lamp slidably mounted to said dovetailed slide and adapted to bodily translate said lamp in another direction normal to said first direction, said block having a groove and clamp for supporting said lamp, and means including resilient members bearing on said lamp at either end thereof for adjusting said lamp in a plane normal to the direction of adjustment of said block support.

3. In a system for adjustably mounting a light source consisting of an incandescent lamp, the combination of a housing for said lamp, a movable slide associated with said housing and adjustable with respect thereto, a mounting block for supporting said lamp and slidably attached to said movable slide for adjusting said lamp in a direction normal to the movement of said slide, spring tensioning means bearing on the extremities of said lamp, and means for varying the position of at least one of said tensioning means to move said lamp with respect to said block and in a direction normal to the direction of movement of said block, said means being accessible from the outside of said housing.

4. In a mounting system for a lamp, a housing enclosing said lamp, a metallic support for said lamp, spring means for positioning said lamp on said support, screw means accessible from the outside of said housing for adjusting the position of said lamp on said support, said spring and screw means being adapted to move said lamp in a straight line, electrical conducting means for mounting said support to said housing, said means being adjustable on said housing, and screw means for adjusting said support on said mounting means.

5. In a mounting for a lamp, the combination of a housing having an aperture therein, a plate having a groove parallel with the axis of said aperture, a slide adapted to be adjusted in said groove, a plurality of pins mounted in said slide, a block slidably mounted on said pins, said block being a conductor of electrical current, a clamping means for holding a lamp on one portion of said block, said lamp being rotatable in said clamping means and bodily movable in a direction perpendicular to the direction of movement of said block, and means including a resilient member at each extremity of said lamp for adjusting its position with respect to said block, one of said resilient means forming an electrical contact to said lamp, the other electrical contact being formed through said block, said means extending externally of said housing.

6. A lamp mounting in accordance with claim 5 which includes means for locking said slide member in adjusted position and means for locking said block in adjusted position.

ERNEST ROSS.